INVENTOR.
MYRON R. SMITH

BY George N. Fisher
ATTORNEY

Oct. 31, 1950  M. R. SMITH  2,527,893
MOTOR CONTROL APPARATUS
Filed July 29, 1948  2 Sheets-Sheet 2

INVENTOR.
MYRON R. SMITH
BY
George N. Fisher
ATTORNEY

Patented Oct. 31, 1950

2,527,893

UNITED STATES PATENT OFFICE 2,527,893

MOTOR CONTROL APPARATUS

Myron R. Smith, Minneapolis, Minn., assignor to Minneapolis-Honeywell Regulator Company, Minneapolis, Minn., a corporation of Delaware Application July 29, 1948, Serial No. 41,336

5 Claims. (Cl. 318—207)

The present invention is concerned with a motor control apparatus and particularly that type of motor control apparatus which prevents hunting of the motor being controlled.

In many present day automatic controls it is desirable to provide a reversible electric motor which may function to position a controller at some remote point. In some instances an accurate method of control may be achieved by using a balanced electrical network as the source of control having a manual adjuster or condition sensing adjuster for varying the balance of the network. When the network becomes unbalanced, an amplifier may sense that unbalance and energize a motor in accordance with the direction of unbalance of the network. The motor in turn may operate a rebalancing adjuster on the network to bring the network to the balance position and when this occurs there will be no signal calling for rotation of the motor. If close control of the motor is desired it is necessary to see that the motor inertia does not carry the rebalancing adjuster beyond the balance point of the network or the desired stopping point of the network. It is therefore often necessary to provide some type of feedback to stop the motor when the signal driving the motor no longer exists. My invention is concerned with an improved type of feedback circuit for stopping the motor when no further operation is needed.

It is a well known phenomena that when a rotor of a motor rotates in an electric field the lines of flux of that field are distorted. If the motor is a two-phase reversible motor of a well-known type where the energizing windings are spaced 90 electrical degrees apart, and one of the windings is continuously energized, continued rotation of the motor rotor with only one of the windings energized will result in a voltage being induced in the other winding. This induced voltage is due to the distortion of the flux lines from the energized winding caused by the rotation of the rotor. When the motor stops rotating the flux lines are no longer distorted and there will be no induced voltage in the winding not continuously energized. The present invention utilizes this induced voltage as a signal for damping the motor to a stop when operation of the motor is no longer desired.

It is therefore an object of the present invention to provide an improved motor control apparatus which will damp the motor to a stop when there is a voltage induced in one of the motor control windings when the rotation of the motor is no longer desired.

A further object of the present invention is to provide an improved damping circuit that will damp the motor only when the motor is operating and the rotor is inducing a voltage in an energizing winding of the motor.

A still further object of the present invention is to provide an improved electronic motor control that is effective to stop operation of the controlled motor when there is no signal in the electronic control calling for rotation of the motor and the motor rotor is inducing a voltage in a control winding of the motor.

Still another object of the present invention is to provide an improved electronic control apparatus that effectively compares a first voltage representative of the need for operation of the control motor and a second voltage representative of the voltage existing at an energizing control winding of that motor so that when the first voltage becomes less than the second, there will be a damping voltage applied to the motor.

These and other more specific and detailed objects will be disclosed in the course of the following specification, reference being had to the accompanying drawings of which:

Figure 1:
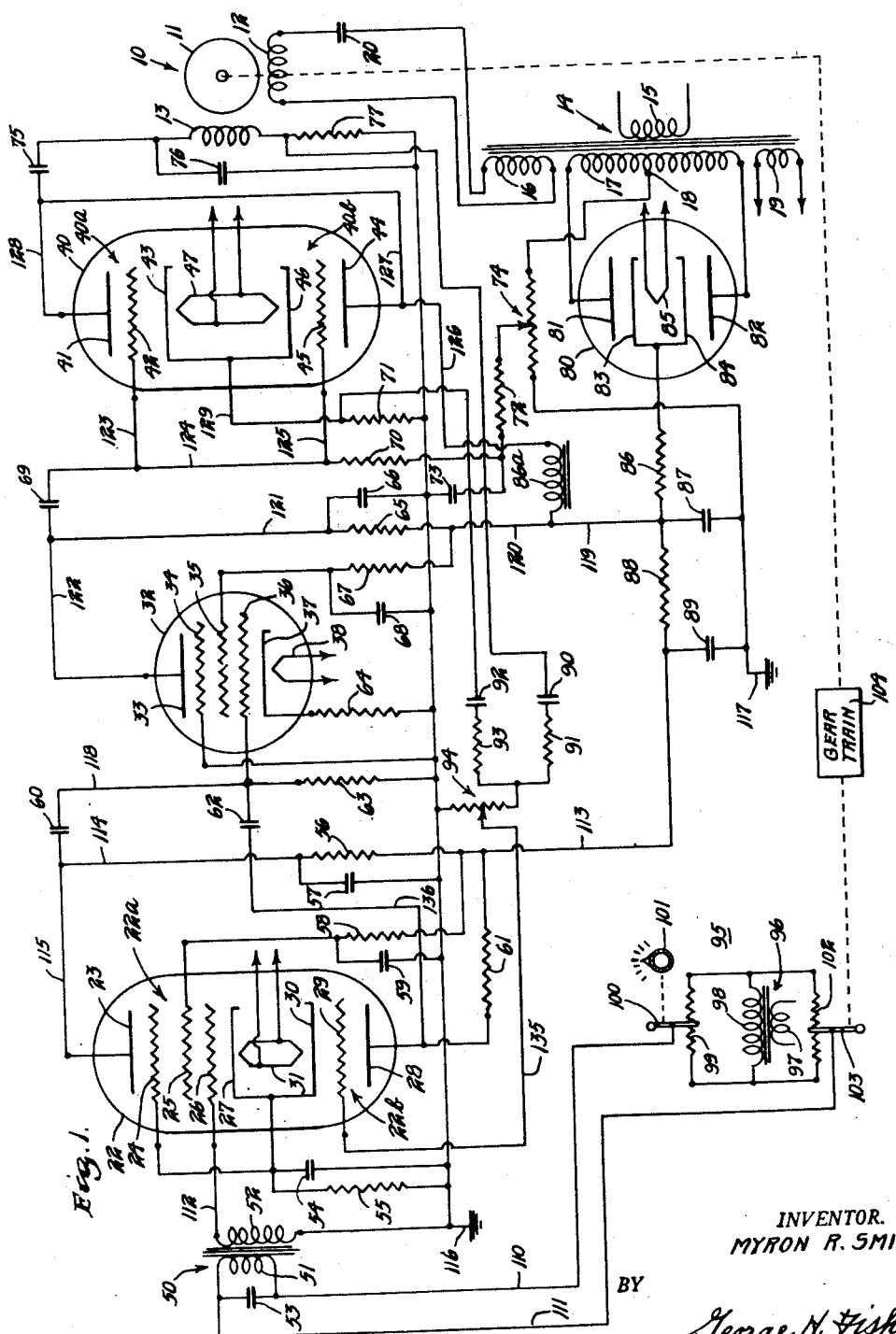
Figure 1 shows one form of my invention applied to an electronic amplifier acting with a balanceable electric network to control the rotation of a motor.

The numeral 10 represents a two-phase reversible electric motor having a rotor 11 and a pair of energizing windings 12 and 13 spaced 90 electrical degrees apart.

An alternating current transformer 14 is provided for supplying power to the subject control apparatus and may be seen to consist of a primary winding 15 which may be connected to any suitable alternating current power source, a secondary 16, a secondary 17, tapped at 18, and a further secondary 19. A phase shifting condenser 20 is associated with energizing winding 12 which is continuously energized by the secondary section 16. The energizing winding 13 is energized by an electronic amplifier which may be seen to consist of three electron discharge devices 22, 32 and 40 and their associated electrical circuits. The discharge device or vacuum tube 22 may be seen to consist of two sections, 22a and 22b, the a section being a pentode section which consists of an anode 23, a suppressor grid 24, a screen grid 25, a control grid 26, and a cathode 27 while the b section is a triode consisting of an anode 28, a control electrode in the form of a grid 29, and a cathode 30. A filament 31 is provided for heating the cathode surfaces to be electron emissive. The electron discharge device 32 may be seen to be a pentode consisting of an anode 33, a suppressor grid 34, a screen grid 35, a control grid 36, and a cathode 37 which is heated to be electron emissive by an associated heater 38. Discharge device 40 is a dual triode consisting of two triode sections 40a and 40b. The a section may be seen to consist of an anode 41, a control electrode in the form of a grid 42 and a cathode 43 while the b section consists of an anode 44, a control electrode in the form of a grid 45, and a cathode 46. A cathode heater 47 is provided to heat the cathodes 43 and 46 to be electron emissive.

The input to tube section 22a may be seen to consist of an input transformer 50 having a primary winding 51 shunted by a condenser 53 and a secondary 52 which is effectively connected between the control electrode 26 and the cathode 27. The biasing voltage for the tube 22 is derived from the cathode biasing network consisting of condenser 54 and a resistor 55 connected in parallel. A resistor 58 is the screen grid resistor and a condenser 59 is the screen by-pass condenser. A resistor 56 is the load resistor for the tube section 22a while the condenser 57 is the anode by-pass condenser. The output of the tube section 22 is coupled to the input of the tube 32 through a coupling condenser or blocking condenser 60.

The load resistor for the tube section 22b is a resistor 61 and the output from the tube section 22b is coupled through a blocking condenser 62 to the input of pentode tube 32. Also associated with the input to tube 32 is a grid resistor 63. A resistor 64 in the cathode circuit of the tube 32 provides degenerative bias for this amplifier stage. The screen voltage resistor is a resistor 67 while a condenser 68 provides the screen by-pass. The load resistor for tube 32 is a resistor 65 and has associated with it a by-pass condenser 66. The output from pentode tube 32 is coupled through a blocking condenser 69 to the input of dual triode tube 40. Resistor 70 is a grid resistor associated with the input to tube 40 and is connected to a filtering network consisting of a resistor 72 and a condenser 73 which is filtering a biasing voltage derived from a biasing potentiometer 74. Further bias for the triode sections 40a and b is derived from a cathode resistor 71. The output of tube 40 is connected through a blocking condenser 75 to the control winding 13 of the motor 10. Connected in series with the winding 13 is a condenser 76 and a resistor 77.

The direct current operating voltages are derived from a direct current power supply that may be seen to consist of a rectifying tube 80 having a pair of anodes 81 and 82 operatively connected to the secondary section 17 and cathodes 83 and 84 heated to be electron emissive by a cathode heater 85. A resistor 86 and a resistor 88 are associated with condensers 87 and 89 as the main filter for the power supply while an inductor 86a provides further filtering in one portion of the power output supply line.

A condenser 90 connected in series with a resistor 91 forms one portion of the feedback network and condenser 92 in series with a resistor 93 form another portion of the series feedback network. A potentiometer 94 is provided as a feedback sensitivity control and the wiper of this potentiometer is connected to the input of the triode 22b.

The signal for controlling the positioning of the motor 10 is derived from a balanceable network 95 which may be seen to consist of a transformer 96 having a primary winding 97, connected to a common source of power with primary winding 15 of transformer 14, and a secondary winding 98. Connected to the secondary 98 is a slidewire 99 and an associated slider 100 which may be positioned by a manual adjuster 101 or by any type of condition responsive device that is capable of moving the slider 100. Also connected to the secondary 98 is a further slidewire 102 which has associated therewith a follow up or balancing slider 103 which is positioned by the rotation of the rotor 11 and is coupled thereto by a suitable coupling means 104.

*Operation of basic motor control*

In considering the operation of the basic motor control, it will be noted that the network 95 is essentially a balanced bridge network which has as its input terminals the ends of the secondary 98 and its output terminals the sliders 100 and 103. When the sliders 100 and 103 are directly opposite each other there will be no output from the balanced network while if the slider 100 is displaced by the controller 101 there will be an alternating current output whose phase will be dependent on the direction of displacement from the balance point of the network. This alternating current output is connected directly to the primary winding 51 of input transformer 50 by conductors 110 and 111. The secondary 52 of the transformer 50 feeds the alternating signal from the network 95 into the pentode section 22a of the tube 22. A conductor 112 is provided to connect the upper terminal of the secondary 52 to the control electrode 26 of the pentode 22a. This pentode 22a is an alternating current amplifier which obtains its plate voltage from a direct current power supply circuit that may be traced from the upper terminal of the condenser 89 through a conductor 113, resistor 56, conductors 114, and 115, anode 23, cathode 27, resistor 55, ground 116, and ground 117 back to the lower terminal of the condenser 89. The signal on the input control electrode 26 is amplified and fed through the conductor 115, blocking condenser 60, and conductor 118 to the control electrode 36 of the pentode 32. The power supply voltage for the pentode 32 may be traced from the upper terminal of the condenser 87 through conductors 119 and 120, resistor 65, conductors 121 and 122, anode 33, cathode 37, resistor 64, ground 116, and ground 117 back to the lower terminal of the condenser 87. The signal on the input control electrode 36 is amplified and fed through the conductor 122, blocking condenser 69, and conductor 123 to control electrode 42 of triode section 40a and through conductors 124 and 125 to the control electrode 45 of the triode section 40b. Since the triode sections 40a and 40b are effectively connected in parallel they function as one tube. A plate voltage for the parallel connected triodes is derived from the condenser 87 and may be traced from the upper terminal of the condenser 87 through conductor 110, choke 86a, conductor 126 to anode 44 and conductors 127 and 128 to anode 41, and from there to the respective cathodes 46 and 43, conductor 129, resistor 71, ground 116, and ground 117 to the lower terminal of the condenser 87. The output from the output amplifier 40 is coupled through the blocking condenser 75 to the control winding 13 of the motor 10. It will be recalled that the motor 10 is of the two-phase type with the windings 12 and 13 spaced 90 electrical degrees apart. With a fixed phase on winding 12 it is possible to reverse the direction by reversing the phase of the voltage applied by the amplifier 40. If the phase of the voltage from the amplifier is leading by 90° that of the phase of the voltage on winding 12 the motor will rotate in one direction. If the amplifier voltage phase is reversed, the motor will rotate in the opposite direction. The phase of the signal that will appear upon the winding 13 from the amplifier 40 will be of such a phase as to cause the rotor 11 to rotate in a direction that will result in the slider 103 being moved in a direction to remove the unbalance that was created by movement of the slider 100. From the foregoing it can be seen that displacement of the slider 100 creates an unbalance of the network 95 and this unbalance is detected and amplified by the amplifier to energize the control winding 13 with a phase corresponding to the unbalance on the network 95 and with control winding 13 so energized the rotor 11 will rotate until such time as the network has been rebalanced by movement of the slider 103 to a position to correspond to that of the slider 100.

*Operation with feedback*

Figure 2:
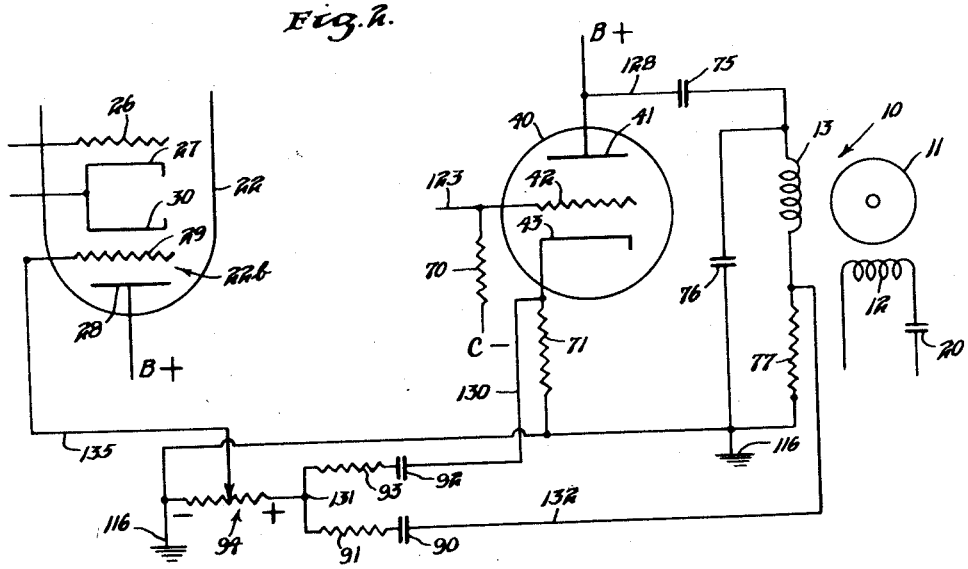
Figure 2 shows certain portions of my invention separated from the rest of the amplifier disclosed in Figure 1 to show better relationship of the apparatus.

As yet, no consideration has been given to the operation of the feedback or antihunt portion of my invention. The Figure 2 shows the antihunt portion of the circuit separated from the main control circuit that is shown in Figure 1. The same reference numerals are applied to corresponding components in both figures.

Under normal operating conditions when there is a need for operation of the motor, there will be a unidirectional pulsating current flowing through the triodes 40a and b, represented as a single triode 40, and this current flow may be traced from the B+ terminal through the anode 41, cathode 43, resistor 71 to ground 116. The alternating component of this pulsating current flows in a closed network that includes the tube 40 as an alternating current generator. This network may be traced from the terminals of the effective generator 40 or cathode 43 through resistor 71, ground 116, resistor 77, winding 13, condenser 75 and conductor 128 to the other generator terminal, anode 41. The alternating current flowing through the winding 13 will result in the generating of flux lines within the winding and this in turn will cause the motor to rotate in a direction corresponding to the phase of the flux or voltage on winding 13. This alternating current circuit will also result in there being an alternating voltage drop on both of the resistors 71 and 77.

The resistors 71 and 77 form a part of a balanced detecting network. The other elements of this detecting network are so connected to the resistors 71 and 77 that any voltage difference existing across the resistors 77 and 71 will appear on the output terminals of the detecting network. The other elements of this detecting network consist of condensers 90 and 92 and resistors 91 and 93. The network is connected between the resistors 71 and 77 in a series circuit and may be traced from the ground terminal 116 between the resistors 71 and 77, through resistor 71, conductor 130, condenser 92, resistor 93, junction 131, resistor 91, condenser 90, conductor 132, and resistor 77 back to the ground terminal 116. The output terminals of the detecting network are ground terminal 116 and the junction of the resistors 91 and 93 at junction 131. As long as the voltage appearing across the resistor 71 is equal to the voltage on the resistor 77, there will be no voltage on the output terminals of the detecting network. These voltages will be equal as long as there is a voltage on the input of the amplifier calling for operation of the motor. That is, as long as the amplifier tube 40 acts as an alternating current generator in the manner discussed above.

As soon as the input signal voltage to the amplifier is no longer effective to cause conduction of the triode 40, there will be no current flow through the triode since the control electrode 42 is connected through resistor 70 to the C− bias supply of the control apparatus and is biased to such a potential as to prevent conduction of the tube when the input signal falls below a predetermined value. When such occurs there will be no voltage drop across the resistors 71 and 72 due to the triode 40 acting as a generator. However, if the rotor 11 continues to rotate under these conditions, the flux from winding 12 will be distorted and a voltage will be induced in the winding 13 and the phase of this voltage will be the same as that which caused rotation of the motor. This induced voltage will circulate through the condenser 76 and the resistor 77, which are connected in series with the winding 13, so that a voltage will be applied to the resistor 77. With a voltage across only the resistor 77 in the detecting network, there will be an unbalanced alternating current voltage on the output terminals of the detecting network which will be of a phase corresponding to the direction of rotation of the rotor 11. Obviously if there is a very small signal being amplified so that there is some current flow through the resistors 71 and 77 due to the input signal, with the voltage induced in the winding 13 by rotor 11 being stronger, the unbalance on the detecting network will be the same as though no signal was present. The potentiometer 94 is provided for picking off the unbalance voltage of the detecting network and feeding the same to the triode amplifier section 22b of the tube 22. The potentiometer 94 also acts as a sensitivity control to determine the magnitude of the unbalance feedback voltage that is to be applied and amplified by the triode 22b. The wiper of the potentiometer 94 may be seen to be connected directly to the control electrode 29 of triode 22b by a conductor 135.

The unbalance voltage applied to triode 22b will be amplified and as seen in Figure 1 will pass the output voltage through conductor 136 and blocking condenser 62 to the control electrode 36 of the pentode 32. The phase of the voltage applied to the control electrode 32 by tube 22b will be opposite the phase of the voltage applied to tube 32 by pentode 22a when there was a signal calling for operation of the motor 10 in the direction in which the rotor is still rotating. This will mean that pentode 32 will now amplify this feedback signal whose phase is opposite the signal which started motor rotation and will cause triodes 40a and b to conduct with a phase relation tending to rotate the motor 10 in the opposite direction.

The reason that this signal is opposite the signal that caused rotation of the motor will be understood by a closer examination of the circuit. Assume first that the motor is being driven by the amplifier 40 and the phase of that driving signal is on one particular half cycle of the alternating current signal, as shown with the triode generator output terminals being plus on the anode 41 and minus on the cathode 43. The voltage phase on the resistor 71 will be minus on the upper terminal and plus on the lower terminal while the phase of the voltage on resistor 77 will be minus on the lower terminal and plus on the upper terminal. As mentioned above, as long as the magnitude of the voltage across the two resistors are equal, there will be no output from the detecting circuit. However, when the amplifier 40 is no longer operative, the only voltage on the detecting network will originate from the winding 13 and the phase of this voltage will be the same as it was when being driven by the amplifier or on resistor 77 it will appear as plus on the upper terminal and minus on the lower terminal. This voltage will appear on the output potentiometer 94 so that its right hand terminal will be plus and its left hand terminal minus. The voltage is then applied to the triode section 22b so that it will cause the control electrode to be plus and the cathode to be minus. The voltage will then be amplified by the three stages 22b, 32 and 40 and with these three stages the phase of the output amplifier 40 will be reversed so that the anode 41 is minus and the cathode 43 is plus. This will result in a phase reversal of the voltage on the winding 13.

In other words, a braking torque or current is applied to the winding 13 which will bring the rotor 11 to a stop. By the arrangement above described, it is possible to have the rotor 11 move the slider 103 into the balance position and then stop moving the rotor to prevent the slider from moving further and unbalancing the control network 95 in the opposite direction. If the slider 103 was not stopped at balance point, a voltage will appear as the output of the network which will drive the motor in the opposite direction and the motor may hunt or oscillate about the balance point.

Figure 3:
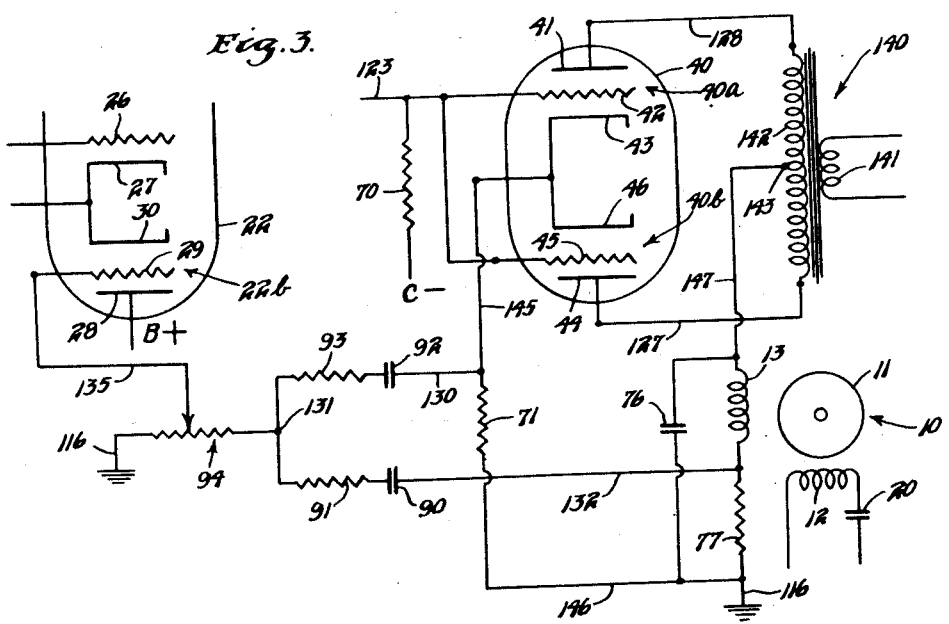
Figure 3 shows a modification of portions of my invention in simplified form as applied to an amplifier having an alternating current discriminating stage as the output stage of the amplifier.

*Figure 3*

In Figure 3, I have shown a modification of the amplifier disclosed in Figure 1 and applied thereto is the antihunt control of my invention. Components which correspond to components of Figure 1 carry the same reference numerals. The major change made between the Figures 1 and 3 is that Figure 3 shows an output stage which is actually a discriminator stage which has alternating current for its operating voltage supply. The power supply for the output dual triode tube 40 in Figure 3 is a transformer 140 which has a primary winding 141 which is connected to a common source of alternating current power. A secondary winding 142 is provided and is tapped at 143.

In operation the triodes 40a and 40b are so connected to the power source that they will conduct on alternate half cycles, provided the respective control electrodes are not biased below the conducting point. In the absence of an input signal to the amplifier there is normally no voltage applied to the conductor 123 which is the conductor connected to the control electrodes of the triode 40a and 40b. As the conductor 123 is also connected to the biasing C— supply through a resistor 70 the triodes 40a and 40b will be biased to be nonconductive. When there is an input signal to the amplifier there will be a voltage appearing on the control electrodes 42 and 45 and the phase of this voltage will be representative of the phase of rotation that it is desired from the rotor 11. The conducting circuit for the triode 40a may be traced from the upper terminal of the secondary 142 through conductor 128, anode 41, cathode 43, conductor 145, resistor 71, conductor 146, resistor 77, control winding 13, conductor 147 to tap 143 of the secondary 142. The conducting circuit for triode 40b may be traced from the lower terminal of the secondary 142 through conductor 127, anode 44, cathode 46, conductor 145, resistor 71, conductor 146, resistor 77, control winding 13, and conductor 147 to the tap 143 on secondary 142. It will be noted that the triodes 40a and 40b are connected to the transformer 142 in such a manner that they will be conductive on alternate half cycles and that the phase of the input signal on the respective control electrodes will determine which of the triodes will be conductive. It will further be noted that the conductive circuits for both of the triodes include the resistors 71 and 77 and the control winding 13 so that when either tube conducts there will be a current flow through the resistors 71 and 77 and the winding 13 and this current flow will be phased to give the desired rotation to the rotor 11 by reason of the flux lines that will emit from the control winding 13.

The voltage drop across the resistor 71 will correspond to the voltage drop across the resistor 77 as long as the triodes 40a and 40b are both conductive. As in the case of Figures 1 and 2 a balanced detecting network is connected to sense the voltages appearing across the resistors 71 and 77 and this balance network may be traced from the ground terminal 116 which connects the resistors 71 and 77 at their lower terminal through conductor 146, resistor 71, conductor 130, condenser 92, resistor 93, junction 131, resistor 91, condenser 90, conductor 132, and resistor 77 back to the ground terminal 116.

As long as the voltages across resistors 71 and 77 are the same there will be no unbalance voltage appearing across the network output terminals 131 and 116. In the event that the signal which has been driving the rotor 11 in a given direction drops below a predetermined value the triodes 40a and 40b will not conduct and there will be no voltage across resistor 71 or across resistor 77 due to current flow from the triodes 40a or 40b. However, if the rotor 11 continues to rotate the flux from the winding 12 which is continuously energized will be distorted and will link the winding 13 to induce therein a voltage in the same manner as occured in Figure 1. This induced voltage will circulate through the series connected condenser 76 and the resistor 77 so that there will be a voltage appearing across the resistor 77. This voltage on resistor 77 will appear across the output terminals of the detecting network.

The potentiometer 94 connected across the output terminals of the network once again serves as a connecting point for the triode 22b and as a selectivity control to govern the amount of signal from the detecting network that will be amplified by the triode 22b. The signal appearing on the control electrode 29 of the triode 22b will be amplified and will be of such a phase that when it is induced into the amplifier it will create a signal that will be calling for operation of the rotor 11 in the direction opposite that in which it is rotating and the triode 40a or 40b will become conductive to pass current flow through the winding 13 at a phase opposite that which initiated operation of the rotor. Thus the motor is brought to a standstill and the controller which is positioned by the motor 11 will no longer be positioned.

From the foregoing it can be seen that I have provided an improved antihunt or damping motor control that will bring the motor rotor to a standstill when the motor is rotating and there is no need for operation of the motor. It may further be seen that I have provided a detecting device which senses the voltages induced in a control winding of a multiphase motor when the rotor is rotating and only a portion of the control windings are energized, and utilize the detected voltage to damp the motor to a standstill. It will be obvious to those who are skilled in the art that many modifications readily suggest themselves from the foregoing specification and therefore I intend to be limited solely by the scope of the appended claims, in which I claim:

1. In combination: an electric motor having first and second energizing windings; means for connecting a source of power to said first energizing winding to continuously energize said winding; an amplifier; means connecting said amplifier to said second energizing winding to energize said winding when there is a need for operation of said motor; means for connecting a source of signal voltage to the amplifier such that upon the signal voltage indicating a need for motor operation said amplifier energizes said second winding; a first impedance in series with said second winding and having a voltage applied thereto by said amplifier when there is a need for operation of said motor or by said second winding due to transfer action from said first winding when the motor continues to operate at a speed greater than indicated by the signal voltage as being needed; a second impedance in said amplifier having a voltage applied thereto by said amplifier when there is a need for operation of the motor; detecting means connected to said amplifier for supplying to the amplifier a voltage opposite in phase to the signal voltage causing the original motor operation; and means so connecting said detecting means to said impedances as to compare the voltages across said impedances and supply the oppositely phased voltage to the amplifier only when said motor operates at a speed greater than indicated by the signal voltage as being needed.

2. In combination: an electric motor having first and second energizing windings; means for connecting a source of power to the first winding to continuously energize the winding; a discharge device having an anode, a control electrode and a cathode and having an input circuit and an output circuit; means connecting the second winding in the output circuit to energize the winding upon a need for motor operation; means for connecting a source of signal voltage to the input circuit to cause conduction of the discharge device upon the signal voltage indicating a need for motor operation; a first impedance in circuit with the second winding in the output circuit and having a voltage applied thereto upon motor operation; a second cathode biasing impedance connected to the cathode of said discharge device and having a voltage applied thereto upon conduction of the discharge device; detecting means connected to the input circuit for supplying thereto a voltage opposite in phase to the signal voltage causing the original motor operation; and means so connecting said detecting means to said impedances as to compare the voltages across said impedances and supply the oppositely phased voltage to the input circuit only when said motor operates at a speed greater than indicated by the signal voltage as being needed.

3. In combination: an electric motor having first and second energizing windings; means for connecting a source of power to said first energizing winding to continuously energize said winding; a discharge device having an anode, a control electrode and a cathode and having an input circuit and an output circuit; means connecting said second winding in the output circuit to energize the winding when there is a need for motor operation; means for connecting a source of signal voltage to the input circuit to cause conduction of the discharge device upon the signal voltage indicating a need for motor operation; a first impedance in circuit with the second winding in the output circuit and having a voltage applied thereto when the motor operates; a second cathode biasing impedance connected to the cathode of said discharge device and having a voltage applied thereto upon conduction of the discharge device; detecting means connected to said input circuit for supplying thereto a voltage opposite in phase to the signal voltage causing the original motor operation; and means so connecting the detecting means to the impedances as to compare two alternating voltages, the magnitudes of which are determined by the voltages across said impedances and supply the oppositely phased voltage to the input circuit only when said motor operates at a speed greater than indicated by the signal voltage as being needed.

4. In combination: an electric motor having first and second energizing windings; means for connecting a source of power to the first winding to continuously energize the winding; an amplifier comprising at least a first, a second, and a third discharge device each having an anode, a control electrode and a cathode and having an input circuit and an output circuit; means for connecting a source of signal voltage to the input circuit of the first discharge device to cause conduction thereof upon the signal voltage indicating a need for motor operation; means connecting the output circuits of the first and second discharge devices to the input circuit of the third discharge device; means connecting the second winding in the output circuit of the third device to energize the winding upon the signal voltage indicating a need for motor operation; a cathode biasing impedance; means so connecting said first impedance common to the input circuits of said first and second devices that a voltage is placed thereacross upon conduction of said first device, which voltage is effective to place a negative potential on the control electrode of the second device with respect to its cathode; a first source of voltage dependent upon the speed of the motor; a second source of voltage dependent upon the magnitude of the signal voltage; detecting means connected to the input circuit of the second device; and means so connecting said detecting means to said sources as to compare the voltages and impress a voltage on the input circuit of the second device sufficient to overcome the negative potential on the control electrode of the second device and cause conduction thereof to supply a voltage to the input circuit of the third device opposite in phase to the signal voltage causing the original motor operation only when said motor operates at a speed greater than indicated by the signal voltage as being needed.

5. In combination: an electric motor having first and second energizing windings; means for connecting a source of power to said first winding; a first and a second impedance connected in series with the second winding; a discharge device having an input circuit and an output circuit; means for connecting a source of signal voltage indicating a need for motor operation to the input circuit to control the conduction of the discharge device; means connecting said second winding and first and second impedances in series in the output circuit to place voltages of equal magnitude across the impedances upon the discharge device conducting to operate the motor; a capacitor across the second winding and first impedance to place a voltage across the first impedance upon the motor operating at a speed greater than indicated by the signal voltage as being needed; means comparing the voltages across said impedances and tending to operate only when the voltage across said first impedance is greater than the voltage across said second impedance; and means connecting the comparing means to the input circuit to place a voltage in the input circuit, upon operation of the comparing means, to brake the motor.

MYRON R. SMITH.

REFERENCES CITED

The following references are of record in the file of this patent:

UNITED STATES PATENTS

| Number | Name | Date |
| --- | --- | --- |
| 2,209,369 | Wills | July 30, 1940 |
| 2,263,497 | Harrison | Nov. 18, 1941 |
| 2,429,257 | Bond | Oct. 21, 1947 |